(12) United States Patent
Hirose et al.

(10) Patent No.: US 6,821,109 B2
(45) Date of Patent: Nov. 23, 2004

(54) RESIN MATERIAL SUPPLY APPARATUS AND METHOD

(75) Inventors: Yoshitaka Hirose, Mooka (JP); Noboru Ito, Mooka (JP)

(73) Assignees: Tsukuba Seiko LTD, Mooka (JP); Sumitomo Bakelite Co. Ltd., Tokyo (JP)

( * ) Notice: Subject to any disclaimer, the term of this patent is extended or adjusted under 35 U.S.C. 154(b) by 168 days.

(21) Appl. No.: 10/091,431

(22) Filed: Mar. 7, 2002

(65) Prior Publication Data

US 2003/0168761 A1 Sep. 11, 2003

(51) Int. Cl.[7] ............................................... B29C 31/06
(52) U.S. Cl. ..................... 425/449; 425/260; 425/581; 425/583
(58) Field of Search ................. 425/116, 257, 425/258, 260, 449, 544, 580, 581, 583; 264/272.17

(56) References Cited

U.S. PATENT DOCUMENTS

| 2,332,938 | A | * | 10/1943 | Schmidberger | ............. | 425/581 |
|---|---|---|---|---|---|---|
| 2,375,252 | A | * | 5/1945 | Sayre | ........................... | 425/581 |
| 2,572,771 | A | * | 10/1951 | Silberkraus et al. | ......... | 425/583 |
| 3,191,234 | A | * | 6/1965 | Hendry | ........................ | 425/449 |
| 3,335,768 | A | * | 8/1967 | Lense | .......................... | 425/257 |
| 5,861,180 | A | * | 1/1999 | Kaneko et al. | .............. | 425/260 |
| 6,080,354 | A | * | 6/2000 | Miyajima | .................... | 425/544 |
| 6,312,629 | B1 | * | 11/2001 | Gusack et al. | .............. | 425/260 |
| 6,508,970 | B2 | * | 1/2003 | Chandra | ..................... | 425/449 |

* cited by examiner

*Primary Examiner*—Robert B. Davis
(74) *Attorney, Agent, or Firm*—Jacobson Holman PLLC

(57) ABSTRACT

A resin material supply apparatus and a method thereof ensuring the supply of a predetermined amount of resin material and improved molding quality. The resin material supply apparatus includes a weighing unit which allows a predetermined amount of resin material to be loaded into weighing pots, an agitating unit which receives the resin material from the weighing pots into agitating cups for agitation using rotating plungers, a traveling unit which allows the agitating unit to travel back and forth between the weighing unit and a molding die, and a supply unit which permits resin material which has been agitated and molten in the agitating cups to be extruded into a mold pot of the molding die by movement of the plungers via a vertically traveling motor rotatable in both forward and reverse directions.

6 Claims, 5 Drawing Sheets

RESIN MATERIAL SUPPLY APPARATUS AND METHOD

BACKGROUND OF THE INVENTION

1. Field of the Invention

This invention relates to an apparatus for supplying a resin material to a molding die by weighing and agitating in the process of plastic encapsulation molding of electronic parts, etc, and to a method thereof.

2. Description of the Related Art

Conventionally, an apparatus illustrated in FIG. 5 is extensively used as the one of this type.

A molding die 61 for forming a plastic encapsulation mechanism shown in FIG. 5 is configured in such a way that a top mold half 61A and a bottom mold half 61B are provided removably, and these top and bottom mold halves 61A and 61B are provided with multiple cavities 63 engraved therein. Multiple mold pots 62 are provided among the cavities of the bottom mold half 61B, and these pots 62 are communicated to cavities 63 through runners 64 and gates 65.

Accordingly, when tablets 72 as resin material are put in the mold pots 62 of the molding die 61 heated and held at a high temperature, and plungers 67 fitted slidably in the mold pots 62 are operated to move up toward the top mold half 61A as indicated by the arrow, then the tablets 72 are pressed and are molten as they are heated by the molding die 61. They are then charged via the runners 64 and gates 65 into the cavities 63 provided with lead frames 63a connected with electronic parts or the like in advance, and plastic encapsulation is carried out in this mechanism.

However, a resin material according to the aforementioned prior art plastic encapsulation is used in the form of tablets 72. This makes it necessary to store many types of the tablets 72 each having a sizes conforming to the capacity of the cavities 63 of the molding die 61 when manufacturing various types of moldings.

Furthermore, the corner portion in particular is damaged during transportation and storage of the tablets 72, and the weight is reduced. This results in a short-shot accompanied by non-performing products. This requires tablets 72 to be managed by separation of damaged ones or a similar method.

SUMMARY OF THE INVENTION

Thus, an object of the present invention is to provide a resin material supply apparatus and method which will ensure a predetermined amount of resin material to be supplied and the molding quality to be improved, without the need for storing many types of tablets or managing the products by separation of damaged ones or by other methods.

To attain the above object, a first embodiment of the present invention provides a resin material supply apparatus comprises a weighing unit, an agitating unit, a traveling unit, and a supply unit.

The weighing unit allows a predetermined amount of the aforementioned resin materials to be loaded into each of weighing pots arranged below via weighing means which has a screw inserted in the weighing tube on the bottom of a hopper storing resin materials, The agitating unit permits agitation to be performed by the rotation of each of plungers with an agitating rod protruded from the tip via agitating means having the aforementioned plungers inserted in multiple agitating cups where the aforementioned resin materials are exchanged between the aforementioned weighing pots and the aforementioned multiple agitating cups arranged in parallel with these pots, The traveling unit allows the aforementioned agitating unit to travel in the forward and backward direction in the space between the aforementioned weighing unit and the molding die via traveling means provided with a pulley and belt mounted on the shaft of a motor capable of forward/reverse drive.

The supply unit permits the resin material in agitating cups to be extruded into the mold pot of the molding die by means of the aforementioned plungers via vertical traveling means provided with a pulley and belt mounted on the shaft of a motor capable of forward/reverse drive.

Thus, the first embodiment of the present invention has the effect of eliminating the need for using resin materials having been weighed and formed into tablets in advance, because the resin material is weighed, agitated and molten, and is supplied to the molding die.

It should be noted that the resin material can be exemplified by a molding material for encapsulation of electronic parts by plastic molding. Thermosetting epoxy resin is a common material.

The molding material frequently used in the prevent invention is powdery or granular, and is characterized by the grade where the temperature of the agitating cups is kept at about 120 degrees Celsius to melt the material, and the molding die temperature is kept at about 180 degrees Celsius to set it.

A second embodiment of the present invention provides a resin material supply apparatus according to the first embodiment further characterized in that;

the aforementioned weighing means comprises a screw for forming a weighing unit, wherein the aforementioned screw is mounted vertically inside the hopper to lead to the bottom end of the weighing tube on the bottom of the hopper and is connected to a weighing motor, and a pot unit movable in the forward and reverse directions is provided on the bottom end of the aforementioned weighing tube, wherein a weighing pot equipped with a shutter plate opened and closed by sliding on the underside is arranged.

Thus, the second embodiment of the present invention has the effect of eliminating a defect or variation in weight which may occur to the tablets (resin materials) formed in advance, and hence removing the need for tablet management by separation or the like, because a screw is inserted into the weighing cylinder for rotation, and a predetermined amount of the resin material can be weighed and loaded into the weighing pot.

A third embodiment of the present invention provides a resin material supply apparatus according to the first embodiment further characterized by the aforementioned agitating means, wherein agitating cups are moved by the pulley and belt mounted on the shaft of the cup traveling motor to the bottom of the weighing pot moved by a weighing pot traveling cylinder so that the aforementioned resin material is received;

the aforementioned multiple agitating cups are moved to the bottom of the aforementioned plunger mounted on the bottom linking plate installed on a guide post;

an agitating rod is protruded from the tip of the plunger by the action of an agitating cylinder mounted on the bottom linking plate; and gears mounted on the aforementioned plungers are meshed with each other by the action of the agitating motor with gears mounted on the shaft thereof so that the aforementioned plungers are rotated, thereby allowing the aforementioned resin material inside the agitating cup to be agitated.

Thus, the third embodiment of the present invention has the effect of ensuring homogenized agitation and melting at a high speed because the resin material received in the agitating cup can be agitated by the rotation of a protruded plunger.

A fourth embodiment of the present invention provides a resin material supply apparatus according to the first embodiment further characterized by the aforementioned traveling means, wherein a traveling motor is installed on the stay extending downwardly of multiple rails along which a running cart with the agitating unit mounted therein travels, and the aforementioned running cart engaged with the belt can be moved in the forward and reverse directions in the space from the aforementioned weighing unit to the aforementioned molding die by the forward and reverse drive of the traveling motor via the pulley and belt mounted on the shaft of this motor.

Thus, the fourth embodiment of the present invention has the effect of ensuring direct transmission of the forward and reverse drive of the motor and hence high-speed traveling and accurate positioning in traveling, because the agitating unit mounted on the running cart is engaged with the belt.

A fifth embodiment of the present invention provides a resin material supply apparatus according to the first embodiment further characterized by the aforementioned vertical traveling means, wherein ball screws are arranged in parallel with one another among the aforementioned multiple guide posts installed on the aforementioned agitating unit;

these ball screws are meshed with ball screw nuts;

the aforementioned multiple plungers installed in a row on the bottom linking plate mounted on these screw nuts are moved downward via the pulley and belt mounted on the shaft of the vertical traveling motor; and a shutter plate provided on the bottom surface of the agitating cup so as to be opened or closed through sliding is made to slide and open, whereby the molten resin material from the agitating cup is supplied to the mold pot of the aforementioned molding die.

Thus, the fifth embodiment of the present invention has the effect of ensuring powerful, accurate and simultaneous lowering of the bottom linking plate where multiple plungers are mounted in a row, because a ball screw mechanism linked to a vertical traveling motor is used.

A sixth embodiment of the present invention provides a resin material supply apparatus according to the first to fifth embodiments further characterized in that the aforementioned resin material is powdery or granular.

Thus, the sixth embodiment of the present invention has the effect of reducing the material cost because the resin material is powdery or granular.

A seventh embodiment of the present invention provides a resin material supply method comprising;

a weighing step of weighing resin materials stored in a hopper and loading it into a weighing pot, an agitating step of feeding the aforementioned weighed resin materials into multiple agitating cups, and agitating and melting them via an agitating unit, a traveling step of moving the agitating unit in the forward and reverse directions in the space from the weighing pot area to the molding die, and a supply step of extruding and supplying the aforementioned resin materials molten in the agitating cup into the pot of the aforementioned molding die;

wherein the aforementioned resin material supply method is capable of weighing, agitating and molding a predetermined amount of resin materials even when these materials are powdery or granular.

Thus, the seventh embodiment of the present invention has the effect of eliminating the need of storing and managing many types of tablets and checking possible damages or managing weight, thereby cutting down management expenses. This is because the resin material can be powdery or granular; it is not required to have been formed in a tablet.

DESCRIPTION OF THE PREFERRED EMBODIMENTS

A resin material supply apparatus according to the preferred embodiments of the present invention will be described with reference to FIG. 1.

Figure 1:
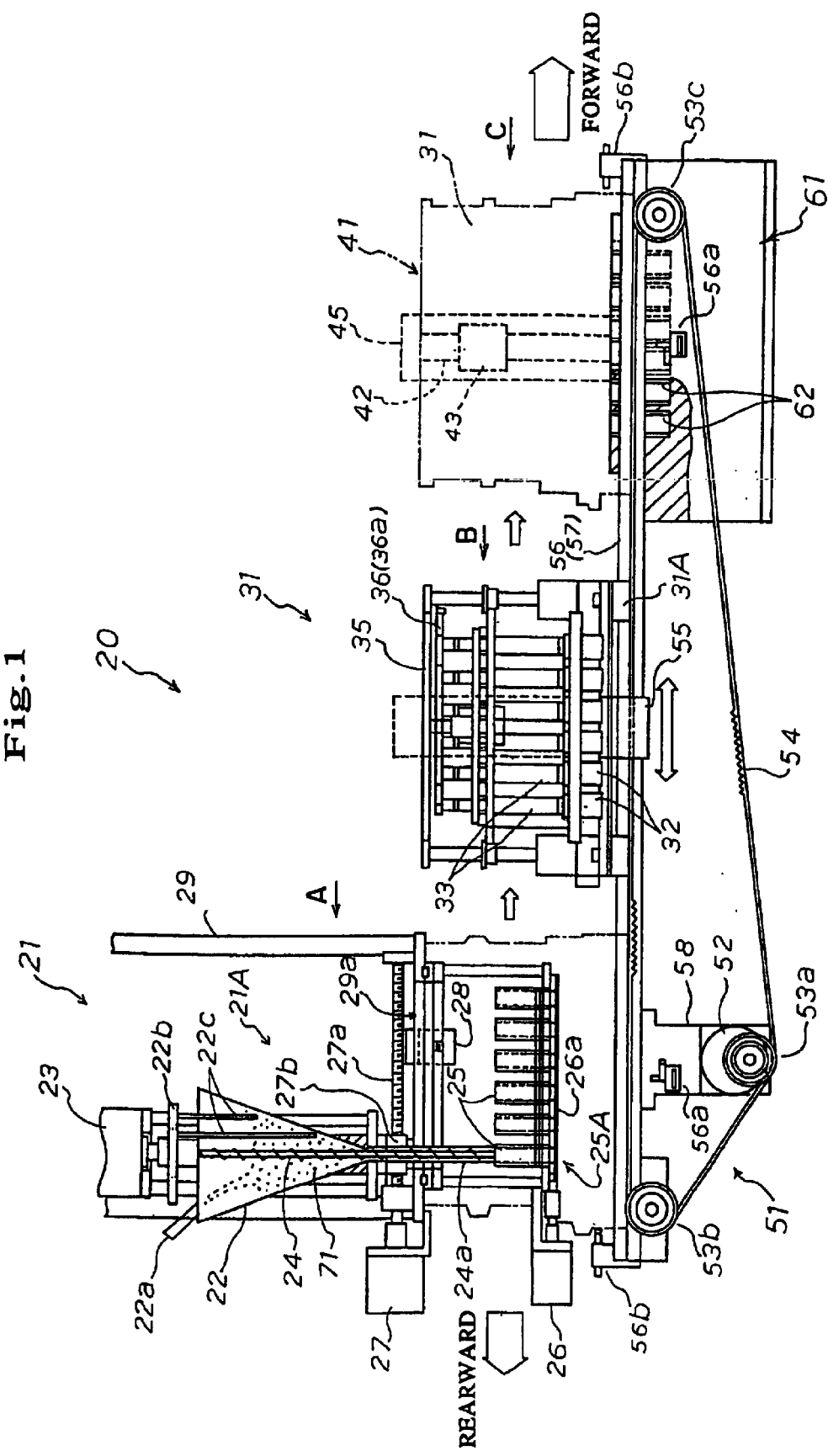
FIG. 1 is a drawing representing the side of a resin material supply apparatus as an embodiment of the present invention.

The resin material supply apparatus 20 shown in FIG. 1 comprises a weighing unit 21, an agitating unit 31, a traveling unit 51 and a supply unit 41.

The weighing unit 21 loads into a weighing pot 25 a resin material 71 stored in a hopper 22 by leading it into a weighing tube 24a through the rotation of a screw 24, and weighing it with this tube 24a in terms of the speed of this screw.

The agitating unit 31 for allows the weighed resin material 71 to be exchanged between a weighing pot 25 and an agitating cup 32 and permits a plunger 33 protruding from the tip of an agitating rod 33a to be inserted into this cup 32 so that this resin material is agitated and molten by the rotation of the plunger.

The traveling unit 51 moves the agitating unit 31 to a molding die 61 while operating it.

The supply unit 41 operates the plunger 33 mounted on the agitating unit 31 and supplies the molten resin material 71 in the agitating cup 32 to the mold pot 62 upon traveling of the agitating unit 31 in such a way that the agitating cup 32 is positioned at the mold pot 62 mounted on the molding die 61.

Figure 5:
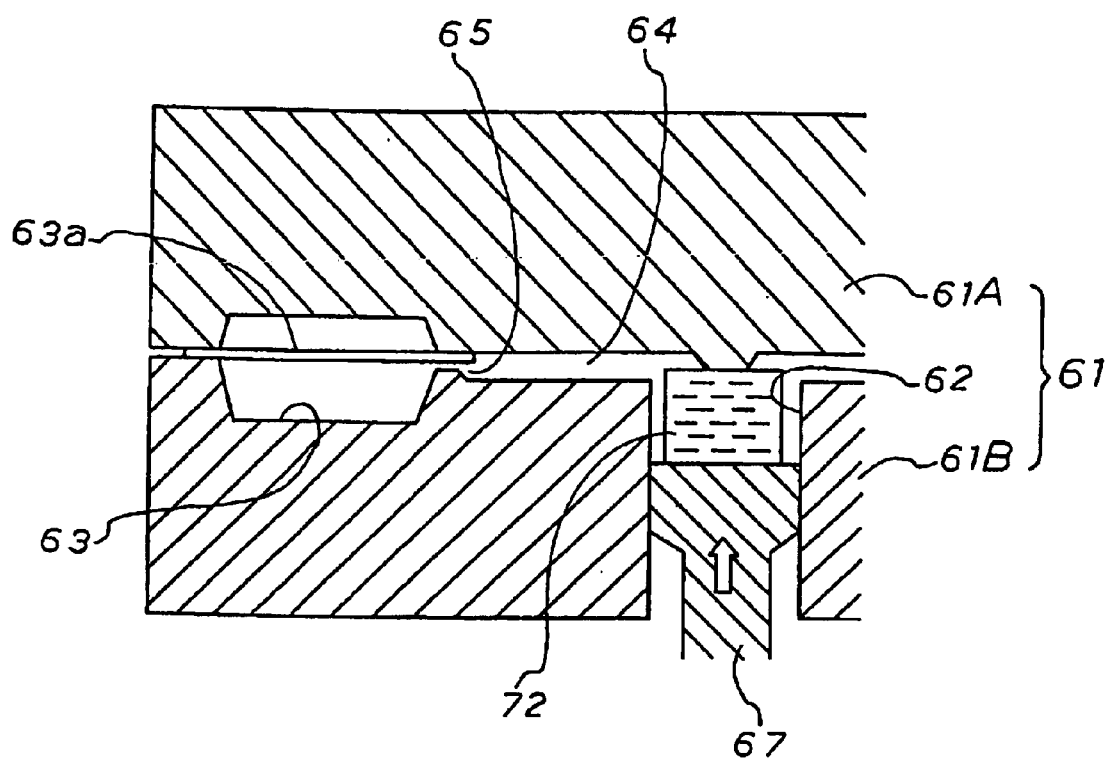
FIG. 5 is a cross sectional view of molding of a resin material according to a conventional technique.

The aforementioned resin material supply apparatus 20 is further characterized in that, similarly to the case of a conventional molding die illustrated in FIG. 5, the molten resin material 71 supplied to the mold pot 62 is extruded into the cavity 63 and molded via the molding plunger 67 inserted into the molding die 61.

The following describes the details of the constituent units.

Weighing Unit

Figure 2:
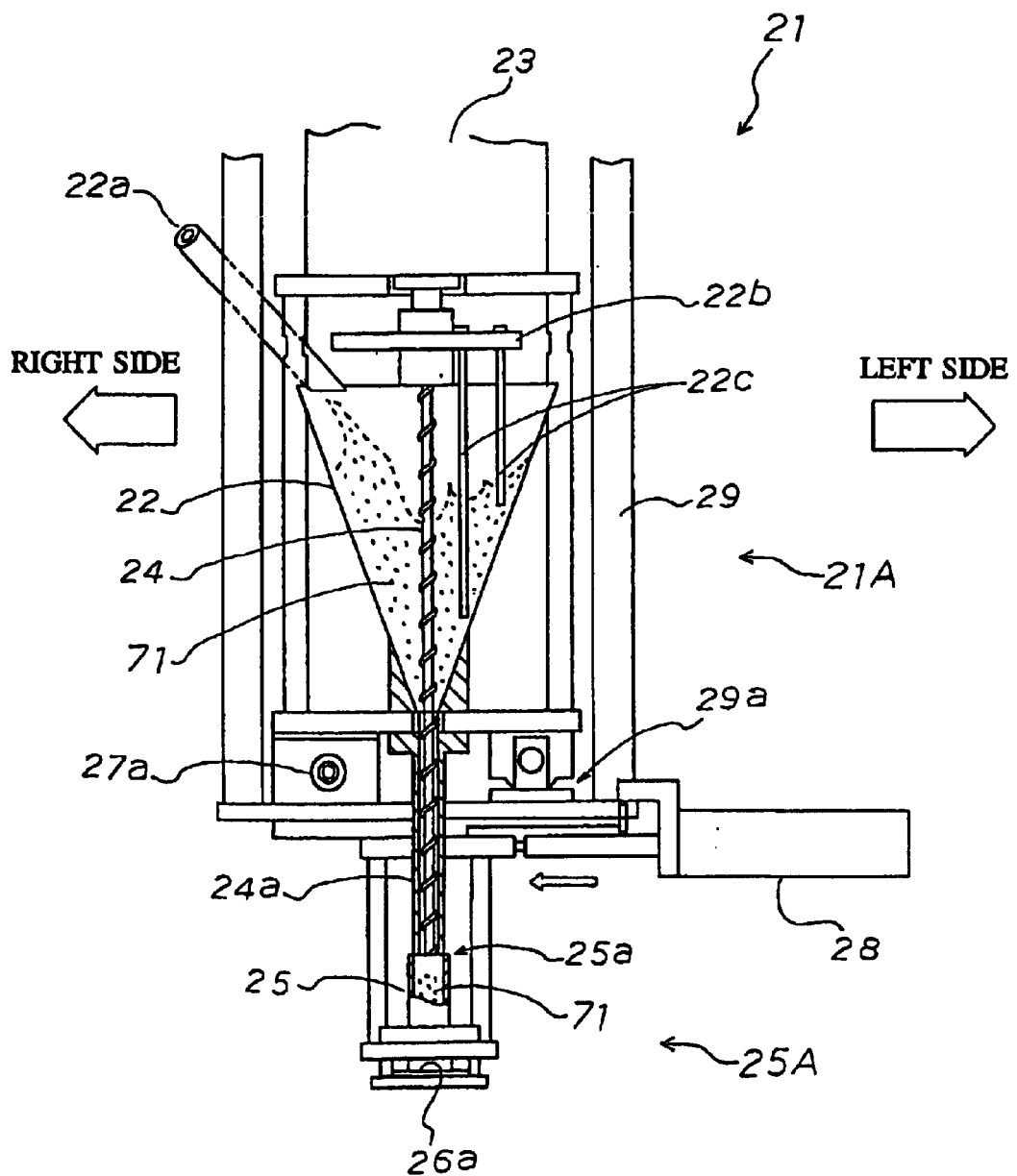
FIG. 2 is a drawing representing a resin material supply apparatus viewed in the direction of arrow A of FIG. 1.

The weighing unit will be described mainly with reference to FIGS. 1 and 2 showing the side and front (view A in FIG. 1) of the weighing unit.

Multiple frame bodies 29 are mounted on this weighing unit 21, which is installed in position by being lifted from above.

A supply port 22a of the resin material 71 penetrating the top of the hopper 22 so that resin material 71 can be supplied from the outside.

Furthermore, the vertically penetrating screw 24 is installed at the center of the hopper 22, and the top of this screw 24 is connected with a joint which penetrates a rotary disk 22b, and is connected with the shaft of the weighing motor 23. Furthermore, multiple collapse pins 22c are suspended from this disk 22b in such a way that collapse pins 22c can enter the resin material 71 of the hopper 22.

Accordingly, if the screw 24 is rotated by the operation of the weighing motor 23, the collapsing rods 22c also rotate around the screw 22 at the same time, thereby collapsing the resin material 71 in the hopper 22 and facilitating meshing with the screw 24.

Furthermore, a weighing unit 21A is configured in such a way that this screw 24 is inserted into the weighing tube 24a provided on the bottom, and a predetermined amount of resin material 71 can be weighed in terms of the speed of the screw 24 in this weighing tube 24a.

A ball screw nut 27b is installed on the right side of the weighing unit 21A to ensure that the weighing unit 21A configured and assembled in one integral body can be moved on the bottom frame of the frame body 29, and a ball screw 27a is installed so that it is meshed with a nut 27b. Further, a sliding section is provided on the left side of the weighing unit 21A to permit sliding with the rail 29a mounted on the bottom frame of the frame body 29.

Thus, a feed motor 27 mounted on the frame body 29 is operated to rotate the ball screw 27a, whereby the weighing unit 21A is moved by sliding on the rail 29a on the left, and the weighing unit 21A moves on each of weighing pots 25 arranged on the bottom. This allows the weighed resin material 71 to be loaded into each of weighing pots 25 from the weighing tube 24a.

The bottom end surface of this pot 25 is provided with a shutter plate 26a whose bottom end port is opened or closed by being slid by an open/close cylinder 26, whereby a pot unit 25A is formed.

This pot unit 25A is configured as shown in FIG. 2. Namely, a pot traveling cylinder 28 is operated, and each of weighing pots 25 filled with resin material 71 and arranged in position is moved in the right-hand direction. The open/close cylinder 26 is operated, and the shutter plate 26a is opened, and the resin material 71 in the weighing pot 25 is loaded into the agitating cup 32 on the agitating cup 32 (see FIG. 3) fed in the left-hand direction from the bottom end surface of the weighing pot 25.

Agitating Unit

Figure 3:
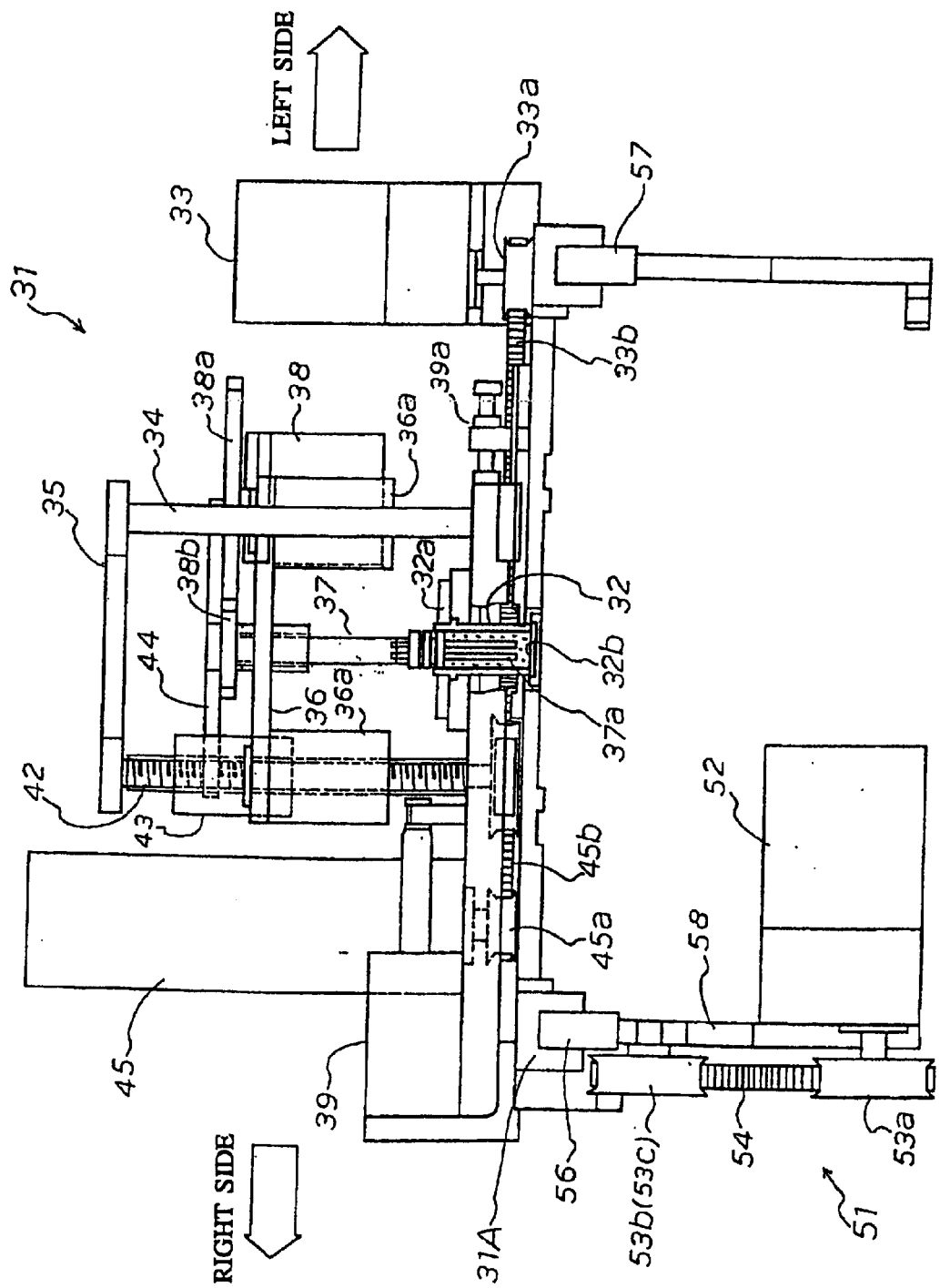
FIG. 3 is a drawing representing a resin material supply apparatus viewed in the direction of arrow B of FIG. 1.

This agitating unit will be described mainly with reference to FIGS. 1 and 3 showing the side and front (view B in FIG. 1) of this unit.

The agitating cups 32 are arranged to receive the resin material 71 from a weighing pot 25. The plunger or a cup traveling motor 33 or moves this cup 32 in the lateral direction. Numeral 34 denotes four upright rectangular guide posts installed so as to surround the agitating cups 32, and 35 represents a top linking plate for connecting these four posts 34 on the top end to fix them in position.

Numeral 36 denotes a bottom linking plate which is assembled slidably with four guide posts 34. An agitating cylinder 36a, a plunger 37 arranged at the center and an agitating motor 38 are mounted at four positions inside these four guide posts 34.

A large-diameter gear 38a mounted on the shaft of this motor 38, and a small-diameter gear 38b is also mounted on the shaft on the top end portion of each plunger 37 in such a way that adjacent gears 38a and 38b are meshed with each other, where gears 38a and 38b are interlocked with each other.

Accordingly, a movable plate 44 is lowered by the operation of an agitating cylinder 36a, and an agitating rod 37a is protruded. At the same time, each of plungers 37 is rotated by the operation of the agitating motor 38, and resin material 71 in the agitating cup 32 is agitated and molten by external heating (not shown) at the same time.

Numeral 39 denotes a plunger section traveling cylinder which is provided on each of the front and back of the agitating unit 31. The agitating unit 31 with the plunger 37 mounted thereon is fed back and forth in the lateral direction by this traveling cylinder 39.

Figure 4:
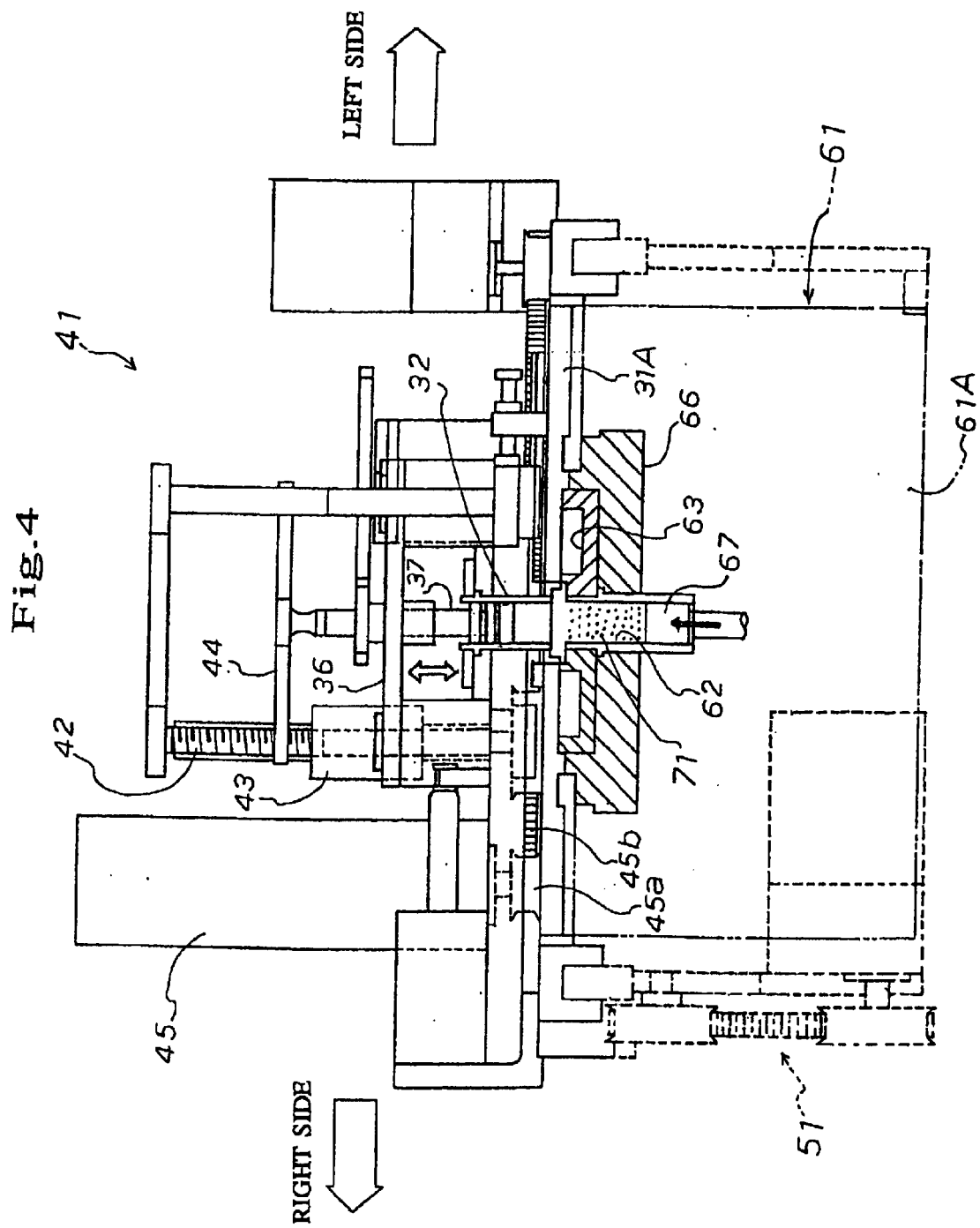
FIG. 4 is a drawing representing a resin material supply apparatus viewed in the direction of arrow C of FIG. 1.

Accordingly, the cylinder 39 is extended to the left in the process of agitation as shown in FIG. 3, and is positioned to permit insertion into the agitating cup 32. In the same manner, the traveling cylinder 39 is extended on the molding die 61 and the position is aligned with the mold pot 62, as shown in FIG. 4.

When the resin material 71 (not shown) is weighed, the traveling cylinder 39 is retracted to pull back the agitating unit 31, and operation is performed in such a way that there is no interference between the agitating unit 31 and weighing unit 21.

Traveling Unit

This traveling unit will be described mainly with reference to FIGS. 1 and 3 showing the side and front (view B in FIG. 1) of this unit.

Numeral 51 denotes a traveling unit. A traveling motor 52 is mounted on the stay 58 suspended downward from the rails 56 and 57 along which traveling cart 31A runs. A timing belt 54 is applied between a pulley 53a mounted on the shaft of this motor 52 and two pulleys 53b and 53c mounted on both ends of the rail 56. A belt clamp 55 extending from the traveling cart 31A and the timing belt 54 are connected between two pulleys 53b and 53c of this belt 54.

Thus, a brake can be applied to the movement of the agitating unit 31 mounted on the traveling cart 31A by means of limit switches 56a provided on the front and back positions through the forward and reverse of the traveling motor 52. Stoppers 56b provided on the front and back ends ensure safety during traveling in the forward and reverse on the rails 56 and 57 from the weighing unit 21 to the molding die 61.

Supply Unit

The supply unit will be described mainly with reference to FIGS. 1 and 4 showing the side and front (view C in FIG. 1) of this unit.

The supply unit 41 is build in the agitating unit 31, and moves integrally with the agitating unit 31 to the molding die 61 indicated by a dot chain line in FIG. 1.

Numeral 42 denotes a ball screw, and 43 a ball screw nut which is connected to a vertical traveling motor 45 through a pulley 45a and belt 45b. The bottom linking plate 36 is fixed to the ball screw nut 43, and multiple plungers 37 are mounted on this linking plate 36 in array.

Accordingly, when the vertical traveling motor 45 operates, the bottom linking plate 36 is locked by the rotation of ball screw 42, and the ball screw nut 43 provided with multiple plunger 37 in a row operates downwardly to open a shutter plate 32b (FIG. 3) at the bottom end of the agitating cup 32, whereby the resin material 71 is extruded into the agitating cup 32.

Molding Die

The following description will be given mainly with reference to FIGS. 1 and 4 representing the side and front (viewed in the direction of arrow C of FIG. 1) of a molding die:

The resin material 71 is supplied into the mold pot 62. The molding plunger 67 is inserted in this pot 62. The cavity 63 is engraved on the molded product profile and is assembled with a chase block 66. It can be taken out from the mold proper 61A together with this block 66 for mold replacement.

Accordingly, resin material 71 supplied into the mold pot 62 is pushed into the cavity 63 which is heated by molding plunger 67 and is held at a high temperature, and is heated and set. Then the molding operation completes.

The following describes the operation.

As described above, a predetermined amount of the powdery or granular resin material 71 supplied to the weighing unit 21A of the weighing unit 21 is fed to the molding die 61 at an appropriate melting temperature by the agitating unit 31, traveling unit 51 and supply unit 41 each performing a series of operation. Thus, excellent molded products are manufactured by their interaction.

A series of these operations is shown in FIG. 1. In the weighing unit 21, the resin material 71 is supplied to the hopper 22. The collapse pin 22c is also rotated around the screw 24 rotated by the operation of the weighing motor 23 in the hopper 22, and the resin material 71 is collapsed without bridging this collapse pin. The resin is supplied in such a way that it can easily be engaged into the thread of the screw 24. This screw 24 weighs a predetermined amount at a predetermined drive speed in the weighing tube 24a, and resin is loaded into the weighing pot 25 of the pot unit 25A from the weighing unit 21A.

Traveling on the upper end face 25a of each weighing pot by the operation of the feed motor 27, the weighing unit 21A allows all the weighing pots 25 to be filled with resin material 71.

When all weighing pots 25 have been filled with resin, the pot traveling cylinder 28 is operated to move the pot unit 25A in the lateral direction. The cup traveling motor 33 (FIG. 3) is also operated so that the agitating cup 32 moves to the left so as to accept it. The open/close cylinder 26 is operated on the bottom of the weighing pot 25 to open the shutter plate 26a, thereby receiving the resin material 71 having been weighed. This step is followed by the return movement to the right until it is positioned below the plunger 37.

As shown in FIG. 3, four agitating rod cylinders 36a operate to allow the agitating rod 37a to be protruded from the tip of the plunger 37. Then the agitating motor 38 with the gear 38a mounted on its shaft is operated, and plunger 37 is rotated through gears 38b each mounted of the shaft of each of the plungers 37, thereby agitating and melting the resin material 71 in the agitating cup 3.

In this case, the agitating cup 32 is heated to about 120 degrees Celsius—temperature for melting resin material 71.

Thus, while performing agitating operation, the agitating unit 31 quickly actuates the traveling motor 52 of traveling unit 51 and moves the timing belt 54 forward until limit switch 56a is actuated to apply a brake.

Upon termination of agitation and melting, agitating cylinder 36a is actuated to move the movable plate 44 upward so that the agitating rod 37a is pulled inside the cylinder 37 to get out of view.

The supply unit 41 built in agitating unit 31 is operated where agitating unit 31 is stopped on the molding die 61. Namely, the vertical traveling motor 45 is started, and ball screw 42 is rotated through the pulley 45a and belt 45b mounted on the shaft. Each plunger 37 mounted on the lowering ball screw nut 43 via the bottom linking plate 36 is lowered at a stretch, and the resin material 71 molten in the agitating cup 32 is supplied into the mold pot 62 on the bottom mold half 61B of molding die 61.

The agitating unit 31 having supplied the resin allows the timing belt 54 to be fed backward by reverse drive of the traveling motor 52 to the pot unit 25A of the weighing unit 21 where the operation is stopped by the limit switch 56a.

The bottom mold half 61B of the molding die 61 is moved up toward the top mold half 61A (not illustrated) to clamp the mold. Then the molding plunger 67 inserted in the mold pot 62 of bottom mold half 61B operates to extrude the supplied and molten resin material 71 into the cavity 63, whereby molding and setting are performed.

The temperature of the cavity 63 is set at about 180 degrees Celsius for heating and setting.

Then the aforementioned operation flow is repeated to perform resin molding.

As described above, in the invention according to embodiment 1, the resin material is weighed, agitated and molten and is supplied to the molding die. This eliminates the need of using the tablet weighed and molded advance as a resin material, and therefore allows a resin material of any form to be used, and ensures stable quality free from variation in weight.

In the invention according to embodiment 2, a screw is inserted into the weighing cylinder, and a predetermined amount of resin material is weighed by rotation and loaded into a weighing pot. This eliminates the step of sorting or separation to avoid defects or variations in weight, unlike the case of a pre-molded tablet (resin material). Thus, separation step is removed and cost reduction is ensured.

In the invention according to embodiment 3, the resin material received in an agitating cup is agitated by the rotation of a protruded plunger, and this provides quick and uniform agitation and melting, as well as stable quality.

In the invention according to embodiment 4, the agitation unit mounted on the running cart is engaged with the belt to permit quick traveling and positioning, with the result that productivity is improved.

In the invention according to embodiment 5, a ball screw mechanism linked to the vertical traveling motor is employed to ensure powerful and accurate lowering of the bottom linking plate with multiple plungers mounted thereon at one time. This ensures uniform operations of multiple plungers, hence stable quality.

In the invention according to embodiment 6, powdery or granular resin materials are used so that there is no need of molding a table. This ensures material cost reduction.

The invention according to embodiment 7 removes the necessity of using various types of tablets as resin materials. It allows use of either powdery or granular materials, thereby eliminating the work of storing and controlling various types of tablets. It also removes a step of damage or weight management, thereby reducing management costs. Thus, this molding method allows a resin material of any form to be purchased at reduced material costs.

Further, the mold pot of the conventional molding die can be used to hold resin materials instead of tablets directly without any modification. A special molding die need not be used. It can be used for various type of molding dies, with the result that the range of molding is expanded and production costs are reduced.

What is claimed is:

1. A resin material supply apparatus comprising;
    a weighing unit which allows a predetermined amount of said resin material to be loaded into each of weighing pots arranged below via weighing means having a screw inserted in the weighing tube on the bottom of a hopper storing resin materials,
    an agitating unit which permits agitation to be performed by the rotation of each of plungers with an agitating rod protruded from the tip via agitating means having said plungers inserted in multiple agitating cups where said resin materials are exchanged between said weighing pets and said multiple agitating cups arranged in parallel with said pots,
    a traveling unit which allows said agitating unit to travel in the forward and backward direction in the space between said weighing unit and the molding die via traveling means provided with a pulley and belt mounted on the shaft of a motor capable of forward/reverse drive, and
    a supply unit which permits the resin material in agitating cups to be extruded into the mold pot of the molding die by means of said plungers via vertical traveling means provided with a pulley and belt mounted on the shaft of a motor capable of forward/reverse drive.

2. A resin material supply apparatus according to claim 1 further characterized in that;
    said weighing means comprises a screw for forming a weighing unit, wherein said screw is mounted vertically inside the hopper to lead to the bottom end of the weighing tube on the bottom of the hopper and is connected to a weighing motor, and
    a pot unit movable in the forward and reverse directions is provided on the bottom end of said weighing tube, wherein a weighing pot equipped with a shutter plate opened and closed by sliding on the underside is arranged.

3. A resin material supply apparatus according to claim 1 further characterized by said agitating means, wherein
    agitating cups are moved by the pulley and belt mounted on the shaft of the cup traveling motor to the bottom of said weighing pot moved by a weighing pot traveling cylinder so that said resin material is received;
    said multiple agitating cups are moved to the bottom of said plunger mounted on the bottom linking plate installed on a guide post;
    an agitating rod is protruded from the tip of said plunger by the action of an agitating cylinder mounted on the bottom linking plate; and
    gears mounted on said plungers are meshed with each other by the action of the agitating motor with gears mounted on the shaft thereof so that said plungers are rotated,
    thereby allowing said resin material inside the agitating cup to be agitated.

4. A resin material supply apparatus according to claim 1 further characterized by said traveling means, wherein
    a traveling motor is installed on the stay extending downwardly of multiple rails along which a running cart with said agitating unit mounted therein travels, and
    said running cart engaged with the belt can be moved in the forward and reverse directions in the space from said weighing unit to said molding die by the forward and reverse drive of said traveling motor via the pulley and belt mounted on the shaft of this motor.

5. A resin material supply apparatus according to claim 1 further characterized by said vertical traveling means, wherein
    ball screws are arranged in parallel with one another among said multiple guide posts installed on said agitating unit;
    these ball screws are meshed with ball screw nuts;
    said multiple plungers installed in a row on the bottom linking plate mounted on these screw nuts are moved downward via the pulley and belt mounted on the shaft of said vertical traveling motor; and
    a shutter plate provided on the bottom surface of the agitating cup so as to be opened or closed through sliding is made to slide and open, whereby the molten resin material from the agitating cup is supplied to the mold pot of said molding die.

6. A resin material supply apparatus according to claim 1 further characterized in that said resin material is powdery or granular.

* * * * *